United States Patent [19]

Peruglia

[11] 3,765,728

[45] Oct. 16, 1973

[54] PIPING FOR VEHICULAR BRAKING SYSTEMS WITH BRAKE FLUID RECIRCULATION

[75] Inventor: Marco Peruglia, Turin, Italy
[73] Assignee: Flat Societa Per Azioni, Turin, Italy
[22] Filed: Mar. 6, 1972
[21] Appl. No.: 231,931

[52] U.S. Cl. .................. 303/1, 285/133 R, 303/10
[51] Int. Cl. ..................... B60t 13/16, F16l 39/02
[58] Field of Search ................. 138/114; 285/133, 285/134; 303/1, 10, 49

[56] References Cited
UNITED STATES PATENTS

| | | | |
|---|---|---|---|
| 3,640,587 | 2/1972 | Milner et al. ..................... | 303/10 X |
| 2,300,547 | 11/1942 | Guarnaschelli ..................... | 285/134 |
| 3,540,475 | 11/1970 | Clark ............................. | 285/134 X |
| 1,374,767 | 4/1921 | Ragsdale ......................... | 285/133 X |
| 2,834,465 | 5/1958 | McMichael ....................... | 285/134 X |
| 2,956,586 | 10/1960 | Zeigler et al. .................... | 285/133 X |

*Primary Examiner*—Mervin Stein
*Assistant Examiner*—David H. Corbin
*Attorney*—Richard C. Sughrue et al.

[57] ABSTRACT

This invention avoids the problem of excessive and vulnerable piping in braking systems with brake fluid recirculation by using flexible piping according to this invention, consisting of two coaxial pipes, the inner of which is used to deliver brake fluid to a brake actuator cylinder and the outer of which forms a return flow duct from the cylinder, a three-way connector being fitted to the piping at the end remote from the cylinder.

2 Claims, 3 Drawing Figures

PIPING FOR VEHICULAR BRAKING SYSTEMS WITH BRAKE FLUID RECIRCULATION

BACKGROUND OF THE INVENTION

This invention relates to braking systems for motor vehicles, of the kind having recirculation of brake fluid.

It is known in hydraulic braking systems for motor vehicles to make use of oil recirculation circuits which include volumetric circulation pumps and tanks which act as heat exchangers. The efficient cooling in such systems makes it possible to dissipate the heat imparted to the hydraulic brake fluid (oil) in existing brake systems, ensuring smooth operation even under severe conditions of use.

The efficient cooling in fact eliminates the dangerous tendency for the hydraulic fluid to boil upon cessation of braking, or more generally when some braking control, for example an anti-skid brake control valve, intervenes: boiling is caused by the sudden drop of pressure in the fluid combined with the high temperature resulting from the preceding braking operation.

Against these considerable advantages attached to recirculating fluid brake systems, there must be set the disadvantage of a more complicated circuit, since it is necessary to supply each brake actuator cylinder of the braking system with a delivery line and with an oil recirculating or return line, which entails a higher cost of construction and a proportionately greater vulnerability of the braking system.

A main object of this invention is to provide an improved piping which avoids these disadvantages by in effect combining the delivery and return lines in a single piping with appropriate connections.

SUMMARY OF THE INVENTION

According to the present invention there is provided piping for a vehicle braking system of the kind having recirculation of brake fluid, said piping comprising an inner pipe defining an inner duct for delivering brake fluid to a brake actuator cylinder and an outer pipe coaxially surrounding the inner pipe and defining therewith an outer duct of annular cross-section for return flow of recirculating brake fluid, the piping cooperating at one end with a three-way connector for connecting the inner and outer ducts to respective delivery and return lines of the recirculatory braking system.

The invention will be more clearly understood from the following description, given by way of non-limiting example, with reference to the attached drawings, in which:

DETAILED DESCRIPTION OF THE ILLUSTRATED EMBODIMENT

Figure 1:
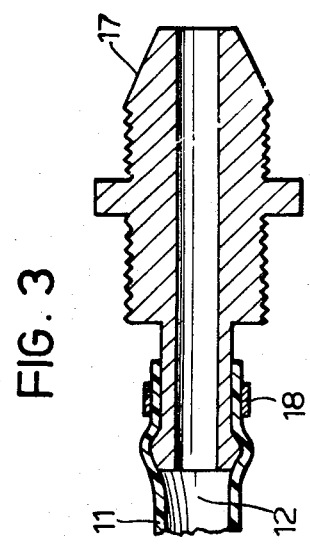
FIG. 1 is an hydraulic circuit diagram of an oil recirculating braking system to which piping according to the invention is applicable.
Figure 3:
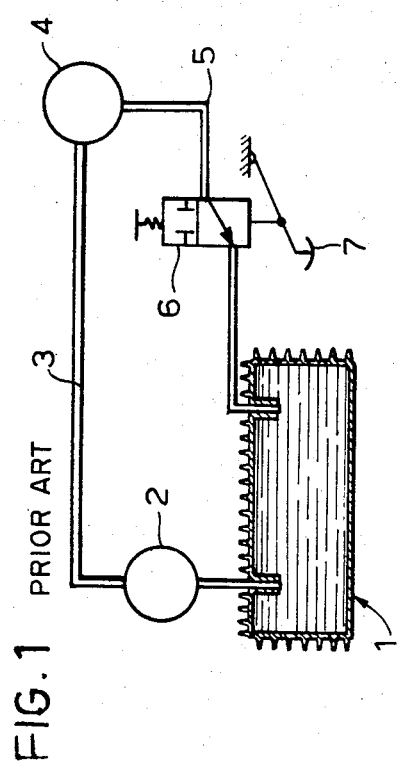
FIG. 3 is a longitudinal section, on a larger scale than FIG. 2, of part of a connector fitted to the piping shown in FIG. 2.
Figure 2:
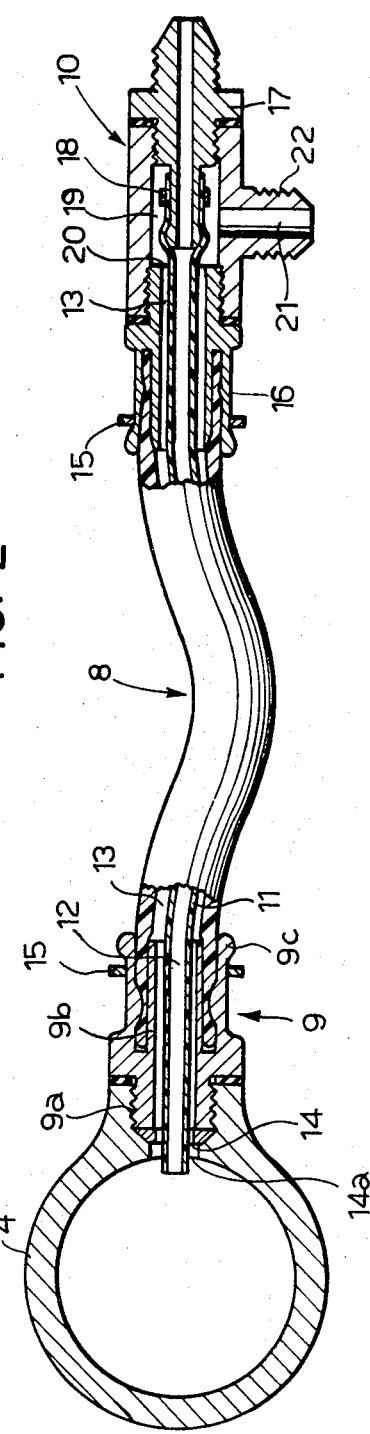
FIG. 2 is a partly cut-away view of a length of piping according to one embodiment of the invention, and the connections cooperating with it.

FIG. 1 shows an oil circulating braking system having a heat exchanger tank 1 from which a volumetric pump 2 draws brake fluid (oil), delivering the oil through a line 3 to individual actuator cylinders 4 of the vehicle brakes (not shown), one only of the cylinders 4 being shown in the interests of clarity. The circulating oil carries away the heat generated in the cylinders 4 upon braking and is then recirculated, through a return line 5 and a valve 6 into the tank 1. The valve 6 is normally open and is operable by a brake pedal 7. When the pedal 7 is depressed the valve 6 is closed, cutting off the recirculating oil flow and causing an increase in the oil pressure upstream of the valve 6, that is, in the actuator cylinders 4, so that braking is effected.

In an oil recirculating braking system of the usual known type it is necessary that for each brake actuator cylinder 4 there shall be an oil delivery line 3, and an oil return line 5. The need to provide two lines 3, 5 for each actuator cylinder 4 involves practical disadvantages as referred to above.

These disadvantages are avoided by using piping according to the invention for connection to each brake actuator cylinder 4. The piping includes an outer tube 8 of flexible, for example elastomeric, material. The tube 8 is connected at one end to a bush 9 which is fitted to the cylinder 4, and at its other end the tube 8 is connected to the oil circulation path by means of a three-way connector 10. The outer tube 8 has within it an inner tube 11 of smaller diameter which defines an internal duct 12 of circular cross section; an outer duct 13 of annular cross-section is bounded by the internal surface of the tube 8 and the external surface of the tube 11. The internal duct 12 communicates with the cylinder 4 at one end and serves to deliver oil under pressure to the cylinder 4.

In the illustrated example the end of the tube 11 in the cylinder 4 is held in a position substantially coaxial with the outer tube 8 by a suitably apertured spacer 14 located between a threaded end 9a of the bush 9 and a countersunk seating at the inner end of a threaded socket in the wall of the cylinder 4 in which the threaded end 9a of the bush 9 engages. The spacer 14 is not, however, indispensable, since coaxial positioning of the inner tube 11 within the outer tube 8 is in practice ensured by the action of the circulating oil.

The outer duct 13 communicates through the apertured spacer 14 with a port 14a open to the interior of the cylinder 4. The bush 9 has a tubular appendage 9b over which one end of the outer tube 8 fits, the wall of the tube 8 being gripped between the said appendage 9b and an outer tubular sleeve 9c formed integrally with the bush 9. The tube 8 is gripped tightly by the action of a clamping member, such as, for example, a clip 15, encircling the sleeve 9c. Other means for sealing and gripping the tube 8 may be used; for example, the tube 8 may be inserted directly in the wall of the cylinder 4.

The other end of the outer tube 8 is attached to a bush 16 which is screwed into the three-way connector 10. An outer bush 17 is also screwed into the connector 10. The bush 17 has an appendage on to which the inner tube 11 is fitted and retained by a clip 18. Finally, the connector 10 has a cylindrical cavity 19 into which a port 20 opens, communicating with the annular duct 13. A branch pipe 21 also communicates with the cavity 19 and has an external screw thread 22.

The oil delivery line 3 is in use of the piping attached to the outer bush 17, while the return line 5 is attached to the external screw thread 22 on the branch pipe 21 of the connector 10. In these circumstances, the oil delivered to the cylinder 4 passes through the bore of the outer bush 17 and through the internal duct 12 to the cylinder 4, effectively cooling the latter. From the cylinder 4 the oil passes through the apertured spacer 14, the outer duct 13 of annular section, the chamber 19 and the branch pipe 21. From the branch pipe 21 the oil flows through the valve 6 (FIG. 1) and thence back to the tank 1, where the heat from the cylinder 4 is dissipated.

In practice the three-way connector 10 is firmly fixed to the chassis of the vehicle, while the piping forms a flexible connection to the cylinder 4, allowing for the relative movement between the respective wheel to which the cylinder 4 is attached and the chassis, due to the vehicle suspension.

It will be appreciated that details of construction and practical embodiments of the invention may be widely varied from what has been described and illustrated without nevertheless departing from the scope of the invention.

I claim:

1. A hydraulic braking system comprising a reservoir, a pump operably connected to said reservoir, brake means, pressure modulating means, hose means operably connecting said pump and pressure modulating means to said brake means and conduit means connecting said pressure modulating means to said reservoir, said hose means comprising a first outer flexible hose having a first threaded bushing secured to one end thereof and connected to said brake means and a second threaded bushing secured to the other end thereof, a three-way coupling having first and second threaded apertures therein disposed in coaxial alignment with a chamber therebetween and a third aperture communicating with said chamber and connected to said pressure modulating means, an apertured threaded fitting disposed in threaded engagement with said first threaded aperture and connected to said pump, said second threaded bushing being disposed in threaded engagement with said second threaded aperture, and a second flexible hose disposed in said first hose to define two fluid passages within said first hose, one end of said second hose extending freely through said second threaded bushing and being connected to said fitting within said chamber in fluid communication with the aperture in said fitting and the other end of said second hose extending freely through said first threaded bushing for delivering fluid under pressure from said fitting to said brake means.

2. A system as set forth in claim 1 wherein said brake means is provided with a threaded aperture for receiving said first threaded bushing and further comprising spacing means located in said aperture for centering said second hose relative to said first threaded bushing.

* * * * *